July 14, 1931.  W. J. MILLER  1,814,482
OPERATING TABLE
Filed Nov. 15, 1929   6 Sheets-Sheet 1

Inventor
W. J. Miller
By  H. D. McDowell
Attorney

July 14, 1931.  W. J. MILLER  1,814,482
OPERATING TABLE
Filed Nov. 15, 1929  6 Sheets-Sheet 2

Inventor
W. J. Miller
By W. D. McDowell
Attorney

July 14, 1931. W. J. MILLER 1,814,482
OPERATING TABLE
Filed Nov. 15, 1929 6 Sheets-Sheet 3

Inventor
W. J. Miller
By W. D. McDowell

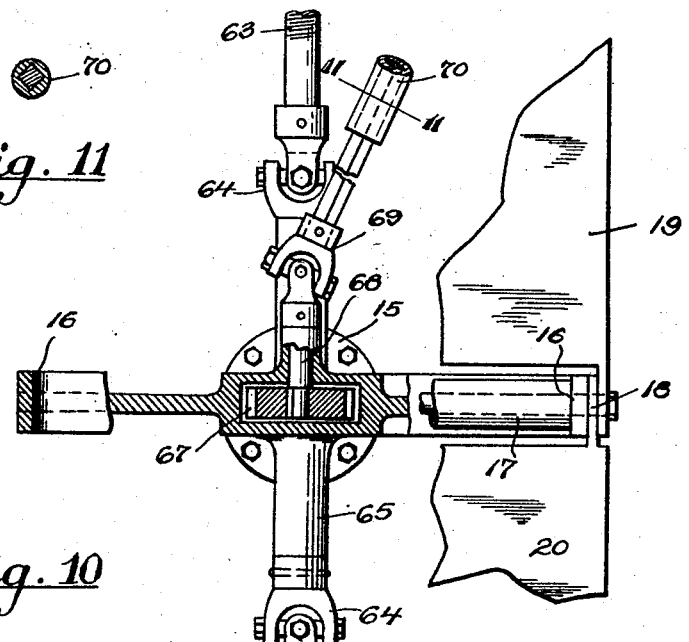
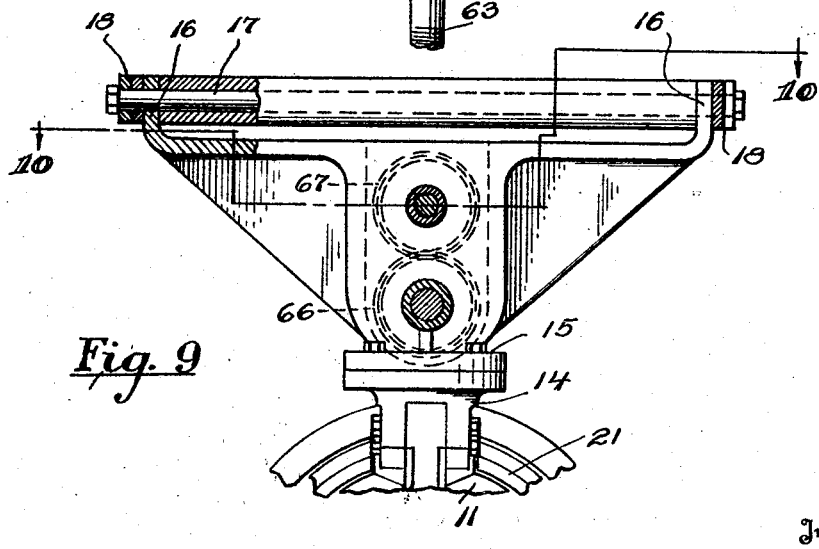

July 14, 1931. W. J. MILLER 1,814,482
OPERATING TABLE
Filed Nov. 15, 1929 6 Sheets-Sheet 5

Inventor
W. J. Miller
By W. A. McDowell
Attorney

July 14, 1931. W. J. MILLER 1,814,482
OPERATING TABLE
Filed Nov. 15, 1929 6 Sheets-Sheet 6

Inventor
W.J.Miller
By W.A. McDowell
Attorney

Patented July 14, 1931

1,814,482

UNITED STATES PATENT OFFICE

WILLIAM J. MILLER, OF COLUMBUS, OHIO, ASSIGNOR TO F. O. SCHOEDINGER, OF COLUMBUS, OHIO

OPERATING TABLE

Application filed November 15, 1929. Serial No. 407,530.

The present invention relates to surgeons' operating tables for use in hospitals, medical dispensaries and the like, and has for its object to improve the construction and efficiency generally of tables of this type.

It is another outstanding object of the invention to provide a table wherein the table sections thereof are carried by a support having a ball and socket mounting which provides for the adjustment of the support and the table sections associated therewith to an unusually wide variety of positions to the end of enabling the table sections to assume operating positions in complete conformity with the requirements of surgeons.

It is another object of the invention to provide positively operating means for regulating the adjustment of the support and for positively and automatically locking the support and its associated table sections in their adjusted positions.

Operating tables heretofore employed have been constructed to include adjustable supports movable about perpendicular axes. Adjustments secured by such structures have been necessarily limited and though serviceable have not been completely satisfactory. However, through the provision of the present invention the ball and socket joint enables the table sections to assume a far greater variety of operating positions than has been obtained by the fixed center construction heretofore employed.

It is another outstanding object of the invention to provide means for readily controlling the adjustment of the ball in its socket and in addition to positively lock the ball and its associated standard and table sections in any of its widely adjusted positions.

Figure 2:
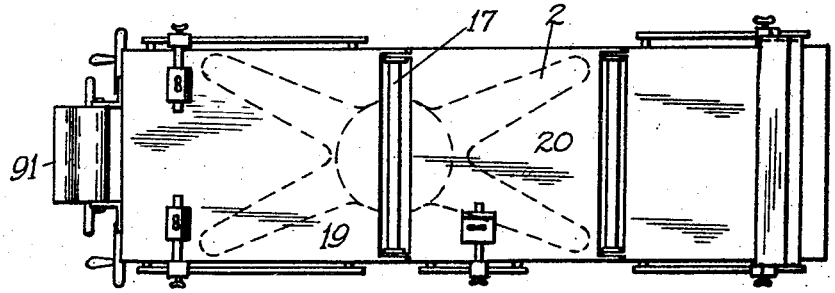
Figure 1:
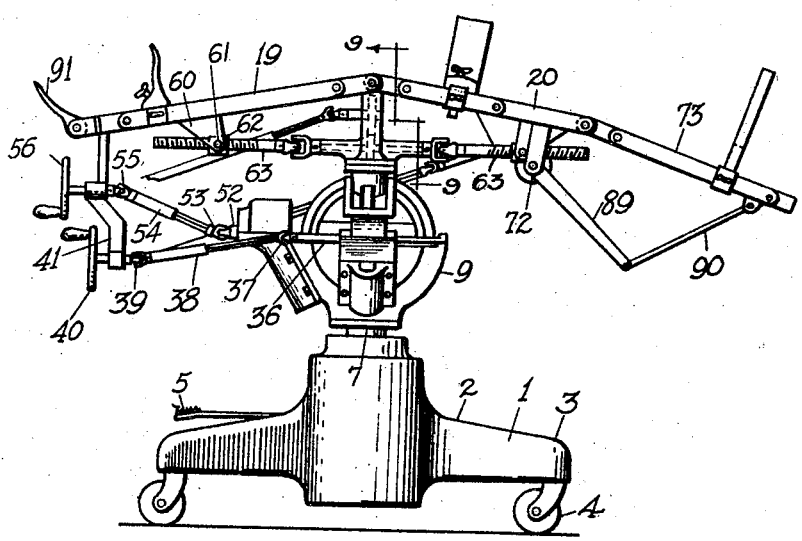
Figure 4:
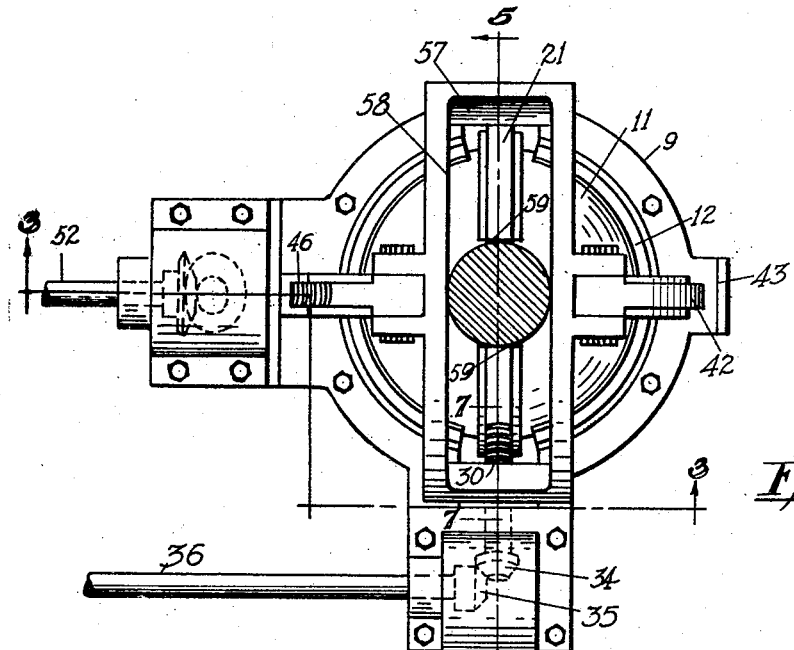
Figure 5:
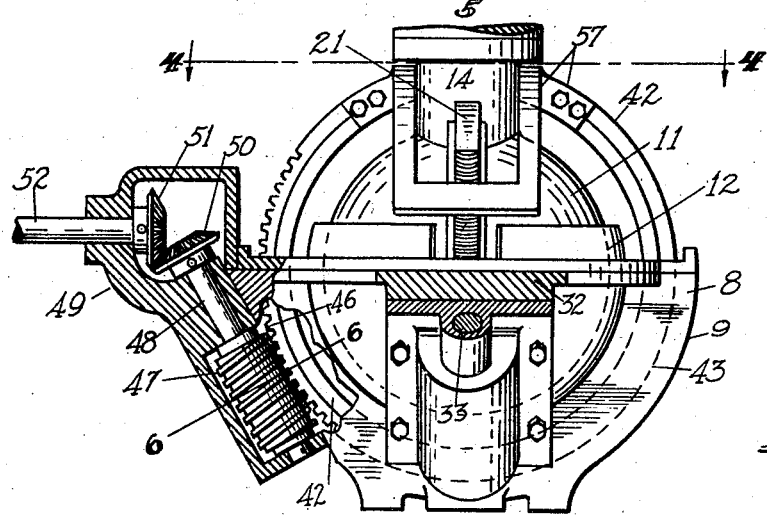
Figure 6:
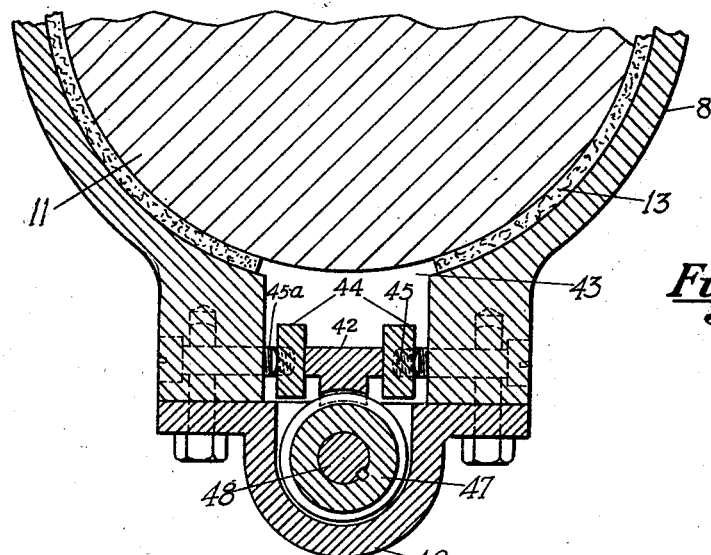
Figure 7:
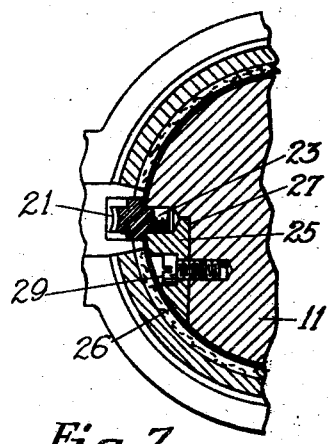
Figure 8:
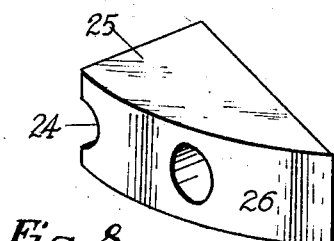
Figure 5:
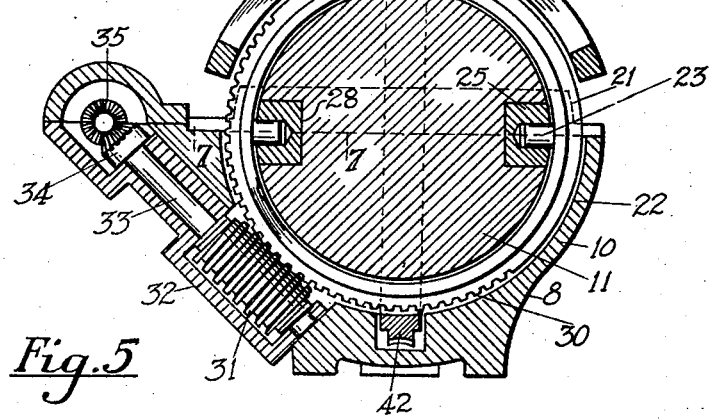
Figure 13:
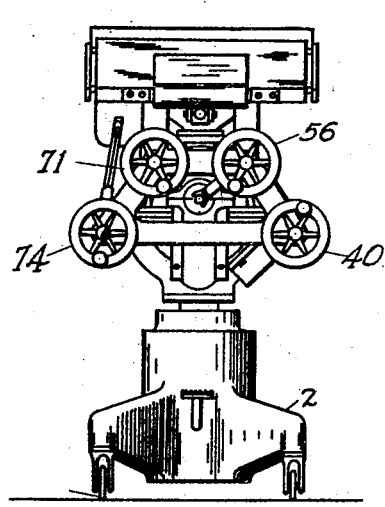
Figure 14:
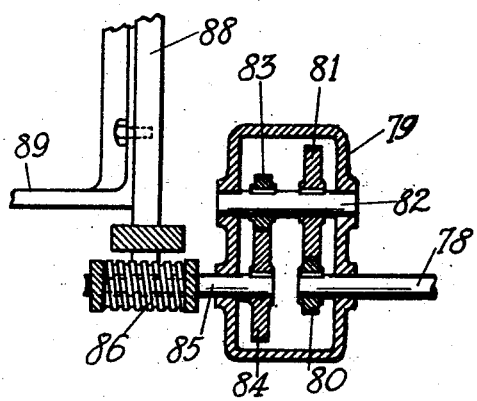
Figure 12:
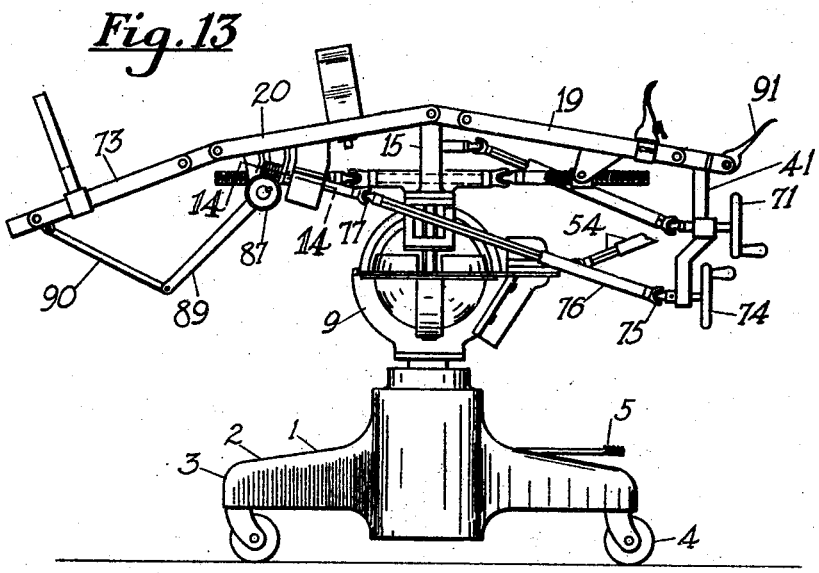
Figure 15:
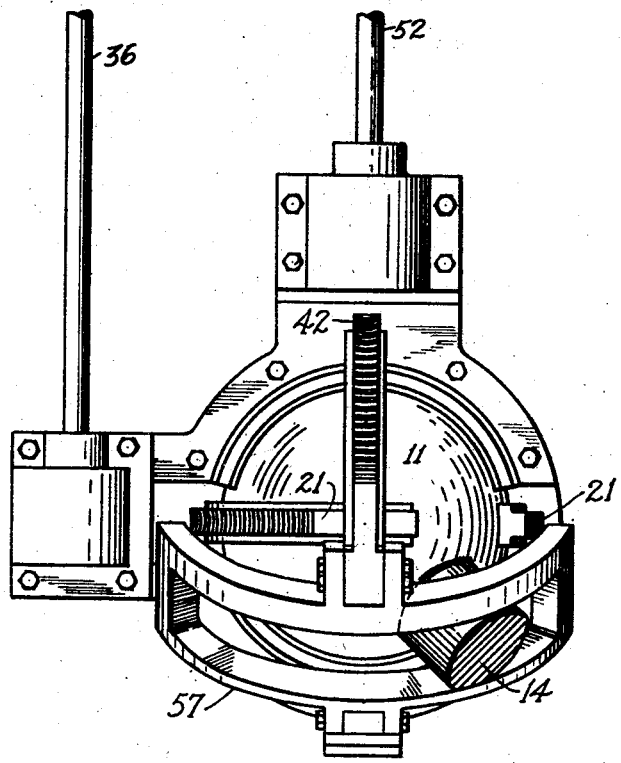

A preferred embodiment of the invention is illustrated in the accompanying drawings in which:

Figure 1 is a side elevation of an operating table constructed in accordance with the present invention, Figure 2 is a top plan view thereof, Figure 3 is a vertical sectional view taken through the ball and socket mounting for the adjustable table sections, the plane of the figure being indicated by the line 3—3 of Figure 4, Figure 4 is a plan view of the ball and socket mounting as indicated by the line 4—4 of Figure 3, Figure 5 is a vertical transverse sectional view taken through the ball and socket mounting on the line 5—5 of Figure 4, Figure 6 is a detail sectional view on the line 6—6 of Figure 3, Figure 7 is a similar view on the line 7—7 of Figure 5, Figure 8 is a detail perspective view of one of the fulcrum blocks, Figure 9 is a transverse vertical sectional view taken through the table sections on the plane indicated by the line 9—9 of Figure 1, Figure 10 is a horizontal sectional view on the line 10—10 of Figure 9, Figure 11 is a detail cross-sectional view on the line 11—11 of Figure 10, Figure 12 is a side elevation of the operating table looking toward the reverse side of the table as depicted in Figure 1, Figure 13 is an end elevation showing the head end of the table and the grouped control wheels, Figure 14 is a detail sectional view on the line 14—14 of Figure 12, and Figure 15 is a plan view of the ball and socket mounting with the neck revolved to an oblique angle.

Referring more particularly to the drawings, the numeral 1 designates my improved operating table in its entirety. In this instance the table is formed to comprise a base casting 2 which is provided with radiating feet 3 formed with floor-engaging wheels 4. The casting 2 may be of any desired shape which will afford a suitable non-tilting base and wherein provision is made for shifting the base and the table structure mounted thereon readily from place to place. As usual, the base is provided with a hydraulic pump mechanism (not shown) which, through the operation of a foot pedal 5, controls the rise and fall of the vertical operating positions of a vertical stem 7. The stem 7 is also mounted in the base so that it may be rotated about its vertical axis and, through the provision of the pump mechanism, may be raised or lowered as the use of the table requires. It is customary to provide operating tables with a pump mechanism of this character and since it does not directly relate to the present invention, a further description thereof will be omitted.

Secured to the upper end of the stem 7 in any desired rigid manner is the stationary casing section 8 of a ball and socket mounting 9. The semi-spherical pocket 10 formed in the casing section 8 is adapted to receive the lower half of the ball section 11 of the mounting. To retain the ball section in place within the pocket 10, the casing 8 is provided with removable flange brackets 12 which enable the casing section of the mounting to embrace the ball section through more than 180° in order to hold said ball section in its properly seated position within the pocket 10. The pocket 10 may be provided with a light packing 13 in order to prevent direct contact between the joining surfaces of the ball 11 and the walls of the pocket 10, the packing 13 serving further to compensate for variations or irregularities in manufacture and in addition to permit of the free movement of the ball section, as it is adjusted, with respect to the stationary surface of the casing 8.

The ball section includes at its upper end a vertically extending boss 14 which is flanged for connection with a corresponding flange provided on the lower end of the table supporting bracket 15. The upper end of this bracket terminates in spaced bearing projections 16 which are apertured to receive the transversely extending cross rod 17 and to this rod there is pivotally connected the adjoining ends 18 of a pair of table sections 19 and 20. The rod 17 functions as a horizontal axis for the purpose of admitting of swinging movements of the table sections 19 and 20 in planes perpendicular to that of said axis, and in addition to this adjustment the table sections are further adjustable through a much wider variety of positions by the construction of the ball and socket mounting which constitutes one of the outstanding features of the present invention.

The ball and socket mounting 9 differs from the ordinary ball and socket joint employed in other lines of manufacture in that provision is made for locking the ball or other movable member of the mounting in any of its adjusted positions relative to the stationary member. The locking means are of a positive character and differ from frictional locks or clamps heretofore employed in this capacity and, further, the locking means function automatically to secure the desired locking effect without attention on the part of the operator. It is, of course, important in an operating table to provide for a wide variety of working positions of the table sections. However, it is of equal importance that the adjustment be secured conveniently and when secured retained against any possibility of accidental displacement. These desirable features are all present in the construction of the mounting 9.

In the attainment of these ends, the ball section 11 is surrounded by a ring 21 which is received within a semi-circular groove 22 provided in the stationary casing section 8 and which groove is in open communication with the pocket 10. The ring is formed to include fixed inwardly projecting studs or trunnions 23 which are received within semi-sockets 24 provided in a pair of fulcrum blocks 25. These blocks have been shown in Figures 7 and 8 wherein it will be observed that each block consists of a metallic body formed with an arcuate outer wall 26 which constitutes a part of the spherical outer surface of the ball section 11. In addition to the wall 26 each block includes a pair of perpendicular walls 27 which engage with corresponding walls formed in recesses 28. The blocks 25 are retained in the recesses 28 by screws 29 which are threaded into the body of the ball section 11. Due to the formation of the recesses, it will be observed that in assembly the blocks 25 are connected with the trunnions 23 of the ring 21. The ball section 11 is then advanced so that its recesses 28 will receive the blocks 25, following which the screws 29 are inserted and tightened in order to connect the ring with the ball section but to permit the ball section to oscillate about the axis afforded by the trunnions and also to rotate bodily in unison with the ring.

The outer portions of the ring are provided with gear teeth 30 which mesh with a single lead worm 31. This worm is positioned for rotation in a cap section 32 forming a part of the casing section 8. The worm 31 rotates with a shaft 33 which is journaled for rotation in the cap section, and which has its upper end equipped with a mitre gear 34 which meshes with a similar gear 35 secured to a second operating shaft 36. The outer end of this operating shaft is connected with the universal joint 37 with which is associated a pair of slidable telescopic shaft sections 38 whose outer ends are connected with a second universal joint 39. Connected with this latter universal joint is an operating wheel 40 journaled in connection with a bracket 41 depending from the head end of the table section 19. The universal joints 37 and 39 and the telescopic shaft sections 38 are provided in order that the ring 21 and the ball and socket joint may be operated and adjusted from the head end of the table whereby the "lateral" adjustments of the table sections 19 and 20 are obtainable.

Since I employ a single lead worm 31 to rotate the ring 21, it will be evident that the ring will be locked against movement and displacement when rotation of the worm ceases. The operation of this mechanism is positive, it does not rely upon the performance of some manual operation, such as the tightening of a friction clamp or the like, and moreover the adjustments secured are of a carefully controlled and minutely regulated character and are automatically locked.

A second ring 42 is employed in conjunction with the mounting and surrounds the ball section 11 exteriorly of and perpendicularly with respect to the ring 21. This outer ring is positioned within grooves 43 formed in the casing section 8 and, in common with the ring 21, lateral movement of said ring 42 is prevented and the ring 42 is confined for rotation or rotary movement to a portion of a circle while occupying a fixed plane. In the operation of the mounting it may be observed at this time that the rings 21 and 42 occupy fixed relatively perpendicular planes. The ring may partially rotate in such planes to effect the adjustment of the ball section, but the rings themselves are confined against any movement other than a rotary movement.

To guide the ring 42 there is provided a pair of shoes 44, which are positioned in the groove 43 on opposite sides of the ring and guidingly engage with the latter. The relative positions of these shoes with respect to each other and with respect to the ring 42 are regulated by screws 45 and 45a. The screws 45 are longer than the screws 45a and are received within threaded openings formed in the shoes 44. The shorter screws 45a frictionally engage the outer surface of the shoes to lock the latter against displacement and to hold the latter in proper guiding engagement with the ring 42. The outer circumference of the ring is provided with gear teeth 46, which mesh with a single lead worm 47 arranged for rotation in connection with a shaft 48 journaled in a housing 49 secured to the casing section 8. The shaft 48 has its upper end equipped with a bevel gear 50 which meshes with a similar gear 51 fixed upon a horizontally extending shaft 52. This shaft is connected with a universal joint 53, with which is connected a pair of telescoping and sliding shaft sections 54 having the cross-sectional formation as shown in Figure 11. The outer ends of the sections 54 are connected with a second universal joint 55 which, in turn, is connected with a hand wheel 56 journaled in connection with the bracket 41.

The ring 42 is formed with a yoke 57 provided with an elongated slot 58 in which is received the boss 14 of the ball section 11 and the side walls of the slot 58 are positioned to guidingly engage and receive the boss 14.

Since the table sections 19 and 20 are directly carried and supported by the ball section or other movable section of the mounting, and since the ring 42 is positioned longitudinally of the table in a vertical plane, it follows that when the hand wheel 56 is rotated the table sections may be oscillated in a vertical plane to secure the so-called Trendelenberg or reverse Trendelenberg positions. However, in addition to the vertical plane of adjustment a much wider variety of operating positions is obtained through the operation of the lateral control 40 which governs the rotation of the ring 21 which is arranged laterally of the table in a plane perpendicular to the ring 42. For example, through the adjustment of the ring 42 the axis of the boss 14 may be arranged at a 45° angle with respect to the vertical and then by rotating the ring 21 a lateral tilting movement may be imparted to the ball section so that the axis passing through its boss 14 may be moved to a 45° angular position with respect to the vertical plane passing through the axis of the table on the plane occupied by the ring 42. Thus the axis of the boss 14 may, through the adjustments described, be adjusted so as to describe a conical orbit of travel with the apex of the cone situated at the center of the ball section or element 11. The ring 21 terminates in spaced ends 59 which are spaced apart a greater distance than the diameter of the boss 14 which permits the boss 14 to move in unison with the rotation of the ring 42 and its associated yoke 57, the fulcrums 23 permitting the ball element to turn in accordance with the movement of the ring 42. Thus irrespective of the advanced travel imparted to the ball element through the operation of the ring 42 a lateral tilt may be given the ball element to move the latter longitudinally of the slot 58 by the operation of the ring 21 and its trunnion connection with the ball element.

It will be seen, therefore, that the ball and socket mounting described permits the table sections to be adjusted through an inverted conical orbit of travel and to assume and be locked in any position within the confines of said conical orbit. Thus the mounting provides an almost countless number of positions which the axis of the mounting may be adjusted to assume. Moreover, these adjustments are positively and readily accomplished through the operation of the two hand wheels 40 and 56. The employment of worm gearing permits of quiet, smooth operation and, of course, attains the locking of the mounting in any of its adjusted positions.

In order to effect the adjustment of the table sections 19 and 20 about the axis of the cross rod 17, the said table sections are provided with fixed depending brackets 60 in which are pivotally carried as at 61 internally threaded nuts 62. Arranged to be received within these nuts are right and left handed screws 63, the inner ends of said screws being connected with universal joints 64. The inner members of these joints are fixed to a short longitudinally extending shaft section 65, which is journaled for rotation in the hollow bracket 15. To rotate the shaft section 65 and consequently the screws 63, whereby to effect the swinging movement of the table sections 19 and 20 about the cross rod 17, a gear 66 is fixed upon the shaft section and is arranged within the bracket 15 for rotation. In mesh with the gear 66 is a corresponding gear 67 which is carried by a stud shaft 68 also journaled for rotation in the bracket 15. The outer end of the stud shaft 68 is connected with a universal joint 69 and with telescopic shaft sections 70, the outer ends of the latter being mounted for rotation within the bracket 41, there being a hand wheel 71 provided, as shown in Figure 13, for effecting the rotation of the shaft 70 and the corresponding rotation of the screws 63. It follows that since the screws 63 are provided with right and left handed threads their simultaneous rotation will result in easily controlled and effective but automatically locked operation.

The table section 20 has pivoted therewith as at 72 a swinging foot section 73. To control the adjustment of this foot section relative to the table section 20 the bracket 41 has journaled herein a shaft operating by a hand wheel 74 which rotates through a universal joint 75 and a pair of telescopic shaft sections 76. The inner member of these shaft sections has its outer end connected by a universal joint 77 with a shaft section 78 which is journaled within bearings provided in a casing 79 stationarily secured to the under side of the table section 20. Within the casing 79 the shaft section 78 is provided with a pinion 80 which engages with a large gear 81 fixed to a jack shaft 82, which is mounted for rotation within the casing 79. Also provided on the jack shaft 82 is a pinion 83 which meshes with a large gear 84. This latter gear is mounted for rotation in the casing and is connected with the inner end of a shaft 85. The outer end of this shaft carriers a worm 86, which meshes with a worm gear 87 mounted upon a transversely journaled shaft 88. To the shaft 88 there is connected a crank arm 89, and the outer end of this crank arm is connected by means of a link 90 with the outer portion of the swinging foot section 73 of the table. By rotating the hand wheel 74 the swinging movement of the foot section as well as its positive locking is effected from the head end of the table.

The table section 19 is provided with the usual adjustable head rest 91, and the sections 19, 20 and 73 have their sides provided with adjustable lateral braces 92.

In view of the foregoing it will be seen that the present invention provides a surgeon's operating table wherein is provided an improved ball and socket mounting which carries the body supporting sections of the table. The ball and socket mounting permits of the attainment of a very great number of operating positions and its construction is such that the mechanism employed for effecting the adjustment of the mounting constitutes also the mechanism for locking the mounting in any of its adjusted positions. In addition to the adjustments provided by the ball and socket mounting the table sections themselves are also independently adjustable to secure an additional variety of operating positions beyond that afforded by the ball and socket mounting. Another advantage resides in the grouping of the operating controls at one end of the table where such controls are readily accessible by the surgeon's assistant or anesthetist.

While the preferred form of the invention has been set forth in considerable detail; it will be appreciated that the invention is not limited to such specific features of construction but is subject to variations and modifications within the scope of the following claims.

What is claimed is:

1. In an operating table, a base, a table section, a ball and socket mounting supported by said base and connected with said table section to maintain the latter in a plurality of operating positions, said mounting comprising a socketed member turnable about a vertical axis passing through said base, a ball member positioned in said socketed member, said ball member being connected with said table section for movement in unison therewith, a split ring surrounding said ball member and connected with the latter by trunnions, a second ring surrounding said ball member and disposed in a plane perpendicular to said first named ring, guide means for maintaining said rings in their fixed relative planes of operation, a slotted connection between said second named ring and said ball member, gear teeth provided upon said rings, and worm gearing engaging with said teeth to effect the rotation and locking of said rings and their connected ball member and table section in various positions of relative adjustment.

2. In an operating table, a base, a table section, a ball and socket mounting carried by said base and connected with said table section, said mounting being formed to comprise stationary and movable members, a gear mounted in guides formed in connection with said stationary member and turnable in a fixed vertical plane, pivotal connections between said movable member and said gear admitting of lateral swinging movement of said movable member relative to said gear while said movable member is turning in unison with said gear, a second gear surrounding said movable member and confined for turning movement in guides carried by said stationary member and in a plane perpendicular to said first named gear, said second gear being provided with a yoke and an elongated slot for the reception of said movable member which lies in the plane of said first named gear, and self locking mechanism for effecting the rotation of said gears.

3. In an operating table, a base, pivotally connected table sections, a ball and socket mounting for effecting the support of said table sections from said base, said mounting being formed to comprise a stationary member and a movable member having spherical bearing surfaces arranged in mutual contact, a split gear confined for rotation in a vertical plane and mounted in fixed guides carried by said stationary member, a second gear arranged substantially perpendicularly to said first named gear and surrounding said movable member for rotation in guides formed with said stationary member, said movable member being formed to include a stem connecting the member with said table sections, a laterally arranged yoke carried by said second named gear, said yoke being formed to include an elongated slot arranged in the plane of said first named gear, trunnion connections between said first named gear and said movable member, said trunnion serving to permit of the rocking of said movable member upon the movement of said second named gear, said yoke and slot permitting of the rocking of said movable member upon the rotation of the second named gear, and self locking actuating means for effecting the rotation of said gears and the automatic locking thereof in their various positions of adjustment.

4. In an operating table, a base, a plurality of table sections, a ball and socket mounting carried by said base and connected with said table sections for moving and rotating the latter in angular positions of adjustment with respect to the vertical axis of the base, said mounting comprising a stationary member having a semi-spherical socket formed therein, a ball member positioned in said socket and supported thereby, an upwardly projecting stem formed with said ball member and positioned for rotation in a vertical plane in connection with guides formed with said stationary member, the spaced ends of said gear being disposed to accommodate said stem, pivotal connections between said gear and said ball member permitting of the swinging movement of said ball member in a plane at right angles to said gear, a second gear surrounding said ball member and arranged in a plane perpendicular to said first named gear, said second named gear being confined for rotation in a vertical plane by guides formed in connection with a stationary member, a yoke formed with and projecting laterally from the ends of said second gear, said yoke being formed with an arcuate slot arranged in the plane of the first named gear and in which said stem is received, said first named gear permitting of the movement of said stem longitudinally of the slot, said second named gear permitting of the rocking of said ball member about the pivotal connections between said ball member and said first named gear, and self locking actuating mechanism for independently and selectively admitting of the rotation of said gears.

5. In an operating table, a base, a table section, a ball and socket mounting supported by said base and connected with said table section to maintain the latter in a plurality of operating positions, said mounting comprising a socketed member turnable about a vertical axis passing through said base, a ball member positioned in said socketed member, said ball member being connected with said table sections for movement in unison therewith, a split ring surrounding said ball member and connected with the latter by trunnions, a second ring surrounding said ball member and disposed in a plane perpendicular to said first named ring, guide means for maintaining said rings in their fixed relative planes of operation, a slotted connection between said second named ring and said ball member, and means for effecting the rotation and locking of said rings and their connected ball member and table section in various positions of relative adjustment.

6. In an operating table, a base, a table section, a mounting supported by said base and connected with said table section to maintain the latter in a plurality of operating positions, said mounting comprising a member turnable about a vertical axis passing through said base, a second member cooperative with said first member, said first member being connected with said table section for movement in unison therewith, a split ring surrounding said first mentioned member and having a pivotal connection therewith, a second ring surrounding said first member and disposed in a plane perpendicular to said first named ring, means for maintaining said rings in their fixed relative planes of operation, a slotted yoke connection between said second named ring and said first mentioned member, and means for effecting the rotation and locking of said rings and their connected first mentioned member and table section in various positions of relative adjustment.

7. In an operating table, a base, a table section, a ball and socket mounting supported by said base and connected with said table section to maintain the latter in a plurality of operating positions, said mounting comprising a socketed member turnable about a vertical axis passing through said base, a ball member positioned in said socketed member, said ball member being connected with said table section for movement in unison therewith, a split ring surrounding said ball member and connected with the latter by trunnions, a second ring surrounding said ball member and disposed in a plane perpendicular to said first named ring, guide means for maintaining said rings in their fixed relative planes of operation, a slotted connection between said second named ring and said ball member, gear teeth provided upon said rings, a worm gear ring carried by said socket member and engaging with said teeth, and flexible controls leading from said gear ring for effecting the movement of said gear ring for the rotation and locking of said rings in their connected ball member and table section in various positions of relative adjustment.

8. In an operating table, a base, a plurality of table sections, a mounting of universal action carried by said base and connected with said table sections for moving and rotating the latter in angular positions of adjustment with respect to the vertical axis of the base, said mounting comprising a stationary member, a movable member positioned above said stationary member and supported thereby, an upwardly projecting stem formed with said movable member, a split gear thereon positioned for rotation in a vertical plane in connection with guides formed with said stationary member, the spaced ends of said gear being disposed to accommodate said stem, pivotal connections between said gear and said movable member permitting of the swinging movement of said movable member in a plane at right angles to said gear, a second gear surrounding said movable member and arranged in a plane perpendicular to said first named gear, said second named gear being confined for rotation in a vertical plane by guides formed in connection with the stationary member, a yoke formed with and projecting laterally from the ends of said second gear, said yoke being formed with an arcuate slot arranged in a plane of the first named gear and in which said stem is received, said first named gear permitting of the movement of said stem longitudinally of the slot, said second named gear permitting of the rocking of said movable member about the pivotal connections between said last named member and said first named gear, and self-locking actuating means for independently and selectively admitting of the rotation of said gears.

9. In an operating table, a base, a table section, a ball and socket mounting supported by said base and connected with said table section to maintain the latter in a plurality of operating positions, said mounting comprising a socketed member turnable about a vertical axis passing through said base, a ball member positioned in said socketed member, said ball member being connected with said table section for movement in unison therewith, right angularly positioned grooves formed in said socketed member which opens into the interior surface of said socket member, rings positioned in said grooves and surrounding said ball member, one of said rings being connected with said ball member by trunnions, and detachable pivot blocks for said trunnions positioned within cavities formed in said ball member.

In testimony whereof I affix my signature.
WILLIAM J. MILLER.